(12) United States Patent
Shpak

(10) Patent No.: US 6,907,229 B2
(45) Date of Patent: Jun. 14, 2005

(54) ENHANCING WIRELESS LAN CAPACITY USING TRANSMISSION POWER CONTROL

(75) Inventor: Eran Shpak, Tel Aviv (IL)

(73) Assignee: Extricom Ltd., Herzeliya (IL)

( * ) Notice: Subject to any disclaimer, the term of this patent is extended or adjusted under 35 U.S.C. 154(b) by 406 days.

(21) Appl. No.: 10/285,869

(22) Filed: Nov. 1, 2002

(65) Prior Publication Data

US 2003/0207699 A1 Nov. 6, 2003

Related U.S. Application Data

(63) Continuation-in-part of application No. 10/214,271, filed on Aug. 7, 2002.
(60) Provisional application No. 60/377,653, filed on May 6, 2002.

(51) Int. Cl.$^7$ .............................. H04B 1/00; H04B 7/00
(52) U.S. Cl. .......................... 455/69; 455/63.3; 455/70; 455/447
(58) Field of Search ............................ 455/525, 69, 68, 455/70, 522, 434, 419, 445, 446, 447, 515, 526, 517, 63.1, 63.2, 63.3; 370/338, 442, 462, 322, 461

(56) References Cited

U.S. PATENT DOCUMENTS

| | | | | |
|---|---|---|---|---|
| 5,696,903 A | * | 12/1997 | Mahany | ....................... 709/228 |
| 5,960,344 A | * | 9/1999 | Mahany | ....................... 455/434 |
| 6,192,026 B1 | | 2/2001 | Pollack et al. | |
| 6,560,448 B1 | | 5/2003 | Baldwin et al. | |
| 6,580,704 B1 | | 6/2003 | Wellig et al. | |
| 6,590,884 B1 | | 7/2003 | Panasik | |
| 2002/0197984 A1 | * | 12/2002 | Monin et al. | ................ 455/419 |
| 2003/0012174 A1 | * | 1/2003 | Bender et al. | ............... 370/347 |
| 2003/0133422 A1 | * | 7/2003 | Bims | .......................... 370/328 |
| 2003/0181221 A1 | | 9/2003 | Nguyen | |
| 2004/0077353 A1 | * | 4/2004 | Mahany | .................... 455/426.2 |

OTHER PUBLICATIONS

IEEE Draft Supplement 802.11h, "Spectrum and Transmit Power Management Extensions in the 5 GHz Band in Europe", Publication P802.11h/D2.1 of the IEEE Standards Department, Piscataway, New Jersey, Jul. 2002.

* cited by examiner

Primary Examiner—Nick Corsaro
Assistant Examiner—John J. Lee
(74) Attorney, Agent, or Firm—Welsh & Katz, Ltd.

(57) ABSTRACT

A method for mobile communication by access points in a wireless local area network (WLAN) includes transmitting a first downlink signal on a common frequency channel from a first access point to a first mobile station, at a first downlink power level, which is adjusted responsively to a first uplink power level transmitted from the first mobile station to the first access point. If the first downlink signal received at a second access point is below a predetermined interference threshold, the second access point may transmit a second downlink signal on the common frequency channel to a second mobile station, simultaneously with transmission of the first downlink signal from the first access point to the first mobile station. The capacity of the WLAN may thus be substantially increased.

28 Claims, 2 Drawing Sheets

ENHANCING WIRELESS LAN CAPACITY USING TRANSMISSION POWER CONTROL

CROSS-REFERENCE TO RELATED APPLICATIONS

This application claims the benefit of U.S. Provisional Patent Application No. 60/377,653, filed May 6, 2002, and is a continuation-in-part of a U.S. patent application Ser. No. 10/214,271 entitled "Collaboration between Wireless LAN Access Points," filed Aug. 7, 2002, whose disclosure is incorporated herein by reference.

FIELD OF THE INVENTION

The present invention relates generally to wireless communications, and specifically to methods and devices for improving the performance of wireless local area networks.

BACKGROUND OF THE INVENTION

Wireless local area networks (WLANS) are gaining in popularity, and new wireless applications are being developed. The original WLAN standards, such as "Bluetooth" and IEEE 802.11, were designed to enable communications at 1–2 Mbps in a band around 2.4 GHz. More recently, IEEE working groups have defined the 802.11a, 802.11b and 802.11g extensions to the original standard, in order to enable higher data rates. The 802.11a standard, for example, envisions data rates up to 54 Mbps over short distances in a band near 5 GHz, while 802.11b defines data rates up to 22 Mbps in the 2.4 GHz band. In the context of the present patent application and in the claims, the term "802.11" is used to refer collectively to the original IEEE 802.11 standard and all its variants and extensions, unless specifically noted otherwise.

The theoretical capability of new WLAN technologies to offer enormous communication bandwidth to mobile users is severely hampered by the practical limitations of wireless communications. Indoor propagation of radio frequencies is not isotropic, because radio waves are influenced by building layout and furnishings. Therefore, even when wireless access points are carefully positioned throughout a building, some "black holes" generally remain—areas with little or no radio reception. Furthermore, 802.11 wireless links can operate at full speed only under conditions of high signal/noise ratio. Signal strength scales inversely with the distance of the mobile station from its access point, and therefore so does communication speed. A single mobile station with poor reception due to distance or radio propagation problems can slow down WLAN access for all other users in its basic service set (BSS—the group of mobile stations communicating with the same access point).

The natural response to these practical difficulties would be to distribute a greater number of access points within the area to be served. If a receiver receives signals simultaneously from two sources of similar strength on the same frequency channel, however, it is generally unable to decipher either signal. The 802.11 standard provides a mechanism for collision avoidance known as clear channel assessment (CCA), which requires a station to refrain from transmitting when it senses other transmissions on its frequency channel. In practice, this mechanism is of limited utility and can place a heavy burden on different BSSs operating on the same frequency channel.

Therefore, in 802.11 WLANs known in the art, access points in mutual proximity must use different frequency channels. Theoretically, the 802.11b and 802.11g standards define 14 frequency channels in the 2.4 GHz band, but because of bandwidth and regulatory limitations, WLANs operating according to these standards in the United States and most European countries actually have only three non-overlapping frequency channels from which to choose. (In other countries, such as Spain, France and Japan, only one channel is available.) As a result, in complex, indoor environments, it becomes practically impossible to distribute wireless access points closely enough to give strong signals throughout the environment without substantial overlap in the coverage areas of different access points operating on the same frequency channel.

Some WLAN standards provide for transmission power control (also known as "transmit power control," or TPC). TPC is applied by access points in order to determine the power level of the signals they transmit to mobile stations. It may also be applied by the mobile stations, as well, in transmission to the access points. Typically, in a WLAN, TPC limits the power transmitted by the access point to the minimum needed to reach the farthest mobile station, and it similarly may limit the power transmitted by the mobile station to the minimum needed to reach the access point that is serving it. TPC is mandated for use by access points in the 5 GHz band by IEEE Draft Supplement 802.11h, entitled "Spectrum and Transmit Power Management Extensions in the 5 GHz Band in Europe" (publication P802.11h/D2.1 of the IEEE Standards Department, Piscataway, N.J., July 2002), which is incorporated herein by reference. TPC in the 5 GHz band is required in some European countries in order to reduce interference with radar. It can also be used for interference reduction, range control and reduction of power consumption by access points and mobile stations.

SUMMARY OF THE INVENTION

It is an object of some aspects of the present invention to provide methods and devices for enhancing the coverage of WLAN systems.

The above-mentioned U.S. patent application, entitled "Collaboration between Wireless LAN Access Points," describes a WLAN system comprising multiple wireless access points distributed within a service region. In order to provide complete coverage of the service region, with strong communication signals throughout the region, the access points are preferably closely spaced. The areas of coverage of the access points, at least when operating at full power, may substantially overlap one another. In order to deal with this overlap, the access points communicate among themselves using a novel protocol over a high-speed, low-latency communication medium. When a mobile station sends an uplink message attempting to initiate communications in a given frequency channel, the access points receiving the message arbitrate among themselves over the medium, in order to decide which of the access points will communicate with this mobile station. Problems of overlapping coverage areas and collisions are thus resolved.

In preferred embodiments of the present invention, transmit power control (TPC) is used to increase the communication capacity of the WLAN system still further. This additional capacity can be achieved using existing network resources, without necessarily increasing the number of available transceivers or adding frequency spectrum. After a first access point is chosen by arbitration to begin communicating with a first mobile station, the access point reduces the power level of the downlink signals that it transmits to the mobile station, using a suitable TPC algorithm. Since the "winner" of the arbitration is typically the closest access point to the given mobile station, and the power measurements are available in real time, it is often possible to reduce the transmitted power substantially, with no power-speed tradeoff. The first access point preferably notifies the remaining access points of the periods during which it is transmitting downlink signals to the first mobile station.

Under these conditions, a second access point may determine that the downlink signals from the first access point are sufficiently weak so that the first and second access points can transmit simultaneously, on the same frequency channel, without mutual interference. This determination may be made by the second access point, for example, by detecting the weak signals, identifying the signature of the transmitting access point (in accordance with the applicable standard), and ascertaining that a sufficient signal/interference margin exists for its own transmissions even in the presence of the weak signal. Then, when a second mobile station sends an uplink message, and the second access point wins the arbitration with respect to this second mobile station, the second access point can transmit downlink signals to the second mobile station simultaneously with the downlink transmissions of the first access point to the first mobile station. The second access point applies TPC, as well, in order not to interfere with the transmissions of the first access point.

This cooperative TPC procedure thus enables the access points to divide the WLAN into dynamic, non-interfering sub-networks. This sub-network structure allows frequency channels to be spatially reused among the access points, thus increasing the capacity of the WLAN.

There is therefore provided, in accordance with a preferred embodiment of the present invention, a method for mobile communication by access points in a wireless local area network (WLAN), wherein the access points include at least first and second access points and are configured to communicate on a common frequency channel with mobile stations, including at least first and second mobile stations, the method including:

receiving a first uplink signal from the first mobile station at the first access point with a first uplink power level;

transmitting a first downlink signal on the common frequency channel from the first access point to the first mobile station in response to the first uplink signal, at a first downlink power level, which is adjusted responsively to the first uplink power level to be less than a maximum downlink power level;

making a determination that while the first access point is transmitting the first downlink signal at the first downlink power level, the first downlink signal received at the second access point is below a predetermined interference threshold;

receiving a second uplink signal from the second mobile station at the second access point; and responsive to the determination, transmitting a second downlink signal on the common frequency channel from the second access point to the second mobile station in response to the second uplink signal, simultaneously with transmission of the first downlink signal from the first access point to the first mobile station.

Typically, the access points have respective service areas within a region served by the WLAN, and the access points are arranged so that at least some of the service areas substantially overlap. Preferably, transmitting the second downlink signal includes partitioning the region served by the WLAN so as to define non-overlapping first and second sub-regions served respectively by the first and second access points. Typically, the access points are arranged so that when the first access point transmits the first downlink signal at the maximum power level, the first downlink signal received at the second access point is above the predetermined interference threshold.

In a preferred embodiment, the first and second downlink signals are transmitted substantially in accordance with IEEE Standard 802.11.

Preferably, transmitting the first downlink signal includes arbitrating among the access points so as to select the first access point to transmit the first downlink signal. Most preferably, arbitrating among the access points includes sending broadcast messages from the access points receiving the first uplink signal, and selecting the first access point responsive to the broadcast messages.

Additionally or alternatively, transmitting the first downlink signal includes making a first association between the first access point and the first mobile station, and informing the second access point of the first association, and making the determination includes measuring the first downlink signal received at the second access point responsively to the first association. Preferably, informing the second access point of the first association includes notifying the second access point of one or more time intervals during which the first access point is to transmit the first downlink signal, and measuring the first downlink signal includes monitoring signals received by the second access point during at least one of the time intervals. Most preferably, transmitting the second downlink signal includes transmitting the second downlink signal during the one or more time intervals after determining that the first downlink signal received at the second access point is below the predetermined interference threshold.

Additionally or alternatively, making the determination includes receiving the first downlink signal at the second access point, and identifying a signature of the first access point in the received first downlink signal.

Preferably, transmitting the second downlink signal includes sending a message from the second access point to the first access point so as to inform the first access point that the second access point is transmitting simultaneously with the first access point.

Further preferably, receiving the second uplink signal includes receiving the second uplink signal at the second access point with a second uplink power level, and transmitting the second downlink signal includes adjusting a second downlink power level of the second downlink signal in response to the second uplink power level, so that the second downlink signal received at the first access point is below the predetermined interference threshold. Typically, receiving the second uplink signal includes sensing a change in the second uplink power level, and transmitting the second downlink signal includes, responsive to the change, ceasing to transmit the second downlink signal simultaneously with the transmission of the first downlink signal.

There is also provided, in accordance with a preferred embodiment of the present invention, apparatus for mobile communication, including a plurality of access points arranged in a wireless local area network (WLAN) and configured to communicate on a common frequency channel with mobile stations, including at least first and second mobile stations, the access points including at least first and second access points, wherein in response to receiving a first uplink signal from the first mobile station at the first access point with a first uplink power level, the first access point transmits a first downlink signal on the common frequency channel to the first mobile station at a first downlink power level, which is adjusted responsively to the first uplink power level to be less than a maximum downlink power level, and wherein the second access point is adapted to make a determination that while the first access point is transmitting the first downlink signal at the first downlink power level, the first downlink signal received at the second access point is below a predetermined interference threshold, and wherein in response to receiving a second uplink signal from the second mobile station at the second access point, and responsive to the determination, the second access point transmits a second downlink signal on the common frequency channel to the second mobile station simultaneously with transmission of the first downlink signal from the first access point to the first mobile station.

The present invention will be more fully understood from the following detailed description of the preferred embodiments thereof, taken together with the drawings in which:

DETAILED DESCRIPTION OF PREFERRED EMBODIMENTS

Figure 1:
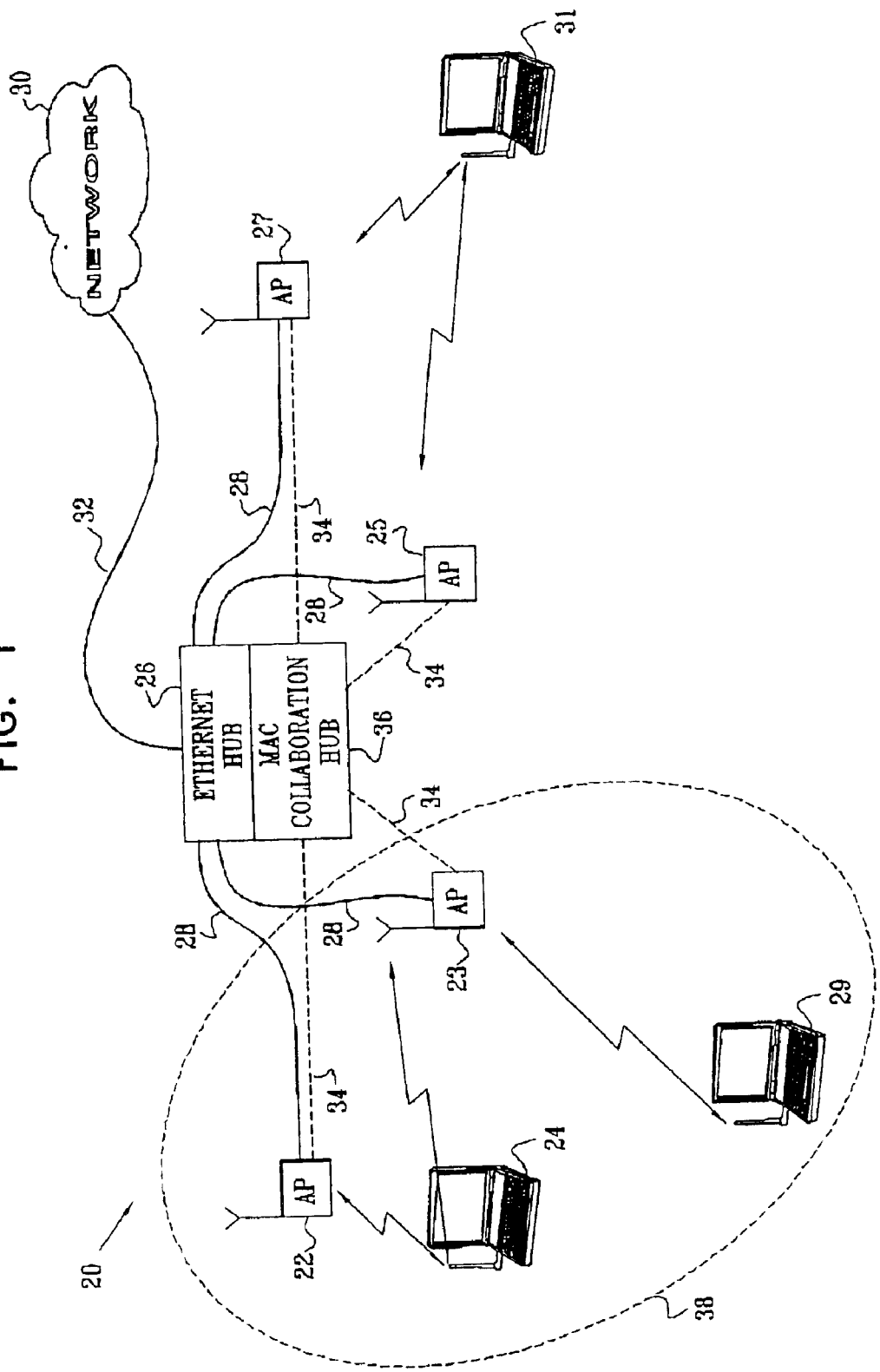
FIG. 1 is a block diagram that schematically illustrates a WLAN system, in accordance with a preferred embodiment of the present invention.

FIG. 1 is a block diagram that schematically illustrates a wireless LAN (WLAN) system 20, in accordance with a preferred embodiment of the present invention. System 20 comprises multiple access points 22, 23, 25, 27, which are configured for data communication with multiple mobile stations 24, 29, 31. The mobile stations typically comprise computing devices, such as desktop, portable or handheld devices, as shown in the figure. In the exemplary embodiments described hereinbelow, it is assumed that the access points and mobile stations communicate with one another in accordance with one of the standards in the IEEE 802.11 family and observe the 802.11 medium access control (MAC) layer conventions. Details of the 802.11 MAC layer are described in ANSI/IEEE Standard 801.11 (1999 Edition), and specifically in Part 11: *Wireless LAN Medium Access Control (MAC) and Physical Layer (PHY) Specifications*, which is incorporated herein by reference. The principles of the present invention, however, are not limited to the 802.11 standards, and may likewise be applied to substantially any type of WLAN, including HiperLAN, Bluetooth and hiswan-based systems.

Access points 22, 23, . . . , are typically connected to an Ethernet hub 26 by a wired LAN 28. The LAN serves as a distribution system (DS) for exchanging data between the access points and the hub. This arrangement enables mobile stations 24 to send and receive data through the access points to and from an external network 30, such as the Internet, via an access line 32 connected to hub 26. LAN 28 is typically capable of carrying data at high speeds, but message latency on the LAN is high, due mainly to collision avoidance mechanisms used in Ethernet and other conventional LANs.

The present invention, however, requires the access points to exchange high-speed messages with low latency, using a novel protocol to provide MAC-level collaboration between the access points. For the purpose of this protocol, the access points are preferably interconnected by a shared communication medium 34 to a MAC collaboration hub 36, in addition to their connection to LAN 28. Medium 34 allows all access points 22 to broadcast and receive low-latency messages to and from all other access points. Exemplary implementations of medium 34 and hub 36 are described in the above-mentioned U.S. patent application, entitled "Collaboration between Wireless LAN Access Points."

Alternatively, instead of using dedicated medium 34 for low-latency messaging, the access points may use a low-latency protocol over LAN 28 itself. This alternative messaging method is described in detail in another U.S. patent application, filed Oct. 17, 2002, entitled "Collaboration Between Wireless LAN Access Points Using Wired LAN Infrastructure," which is assigned to the assignee of the present patent application and is incorporated herein by reference. Further alternatively, substantially any means known in the art may be used for communication between the access points, as long as it meets the speed and latency constraints imposed by the applicable WLAN standard or other requirements.

For the sake of the description that follows, it is assumed that access points 22, 23, 25 and 27 all transmit and receive signals on the same frequency channel, to which mobile stations 24, 29 and 31 are likewise tuned. Typically, as noted in the Background of the Invention, WLAN system 20 includes additional access points operating on other frequency channels, but these additional access points do not interfere with communications on the frequency channel of access points 22, 23, 25 and 27, and therefore are not of concern here. Rather, the methods of access point collaboration of the present invention, as described hereinbelow with reference to access points 22, 23, 25 and 27, may be carried out independently by the set of access points on each of the operative frequency channels in system 20.

Downlink signals transmitted at full power by any of access points 22, 23, 25 and 27 can, in principle, be received by any of mobile stations 24, 29 and 31. In WLAN systems known in the art, if adjacent access points 22 and 23 were to transmit simultaneously on the same frequency channel, for example, mobile station 24 would receive downlink signals from both access points. This overlap would probably result in inability of the mobile station to communicate with any of the access points. In preferred embodiments of the present invention, however, access points 22, 23, 25 and 27 communicate with one another over medium 34 (or LAN 28) in order to resolve this conflict using a MAC-level collaboration protocol, as described in the above-mentioned patent applications.

Furthermore, the MAC-level collaboration protocol of the present invention allows the access points to dynamically define portions of the service area of system 20 as spatial sub-networks, such as a sub-network 38 shown in FIG. 1. The method by which these sub-networks are defined is described in detail below with reference to FIG. 2. In brief, by way of example, after mobile station 24 has exchanged association messages with access point 22 (as required in order to begin communications under the 802.11 standards), access point 22 uses transmit power control (TPC) to reduce its transmission power in downlink messages to mobile station 24. The power is preferably reduced to a minimum level that will allow the mobile station to receive the downlink messages reliably at the highest possible speed.

At this transmission power level of access point 22, nearby access point 23 and mobile station 29 may still receive the downlink messages from access point 22, but access points 25 and 27 and mobile station 31 will not. Therefore, if mobile station 31 becomes associated with access point 27, for example, it is then possible for access point 27 to transmit downlink messages to mobile station 31, with power level reduced by TPC, simultaneously with the downlink transmission by access point 22 to mobile station 24. System 20 is thus partitioned dynamically into two sub-networks, each with its own service sub-region, operating simultaneously. Larger numbers of simultaneous sub-networks may be defined in like fashion. These sub-networks are used when the participating access points transmit downlink signals at low power to nearby mobile stations. Such simultaneous downlink communications may be inhibited when one of the access points transmits downlink signals to a more distant mobile station (such as when access point 23 transmits to mobile station 29), requiring higher power. The sub-network partition may be restored thereafter, as access points 22 and 27 resume their respective low-power transmissions to mobile stations 24 and 31.

Figure 2:
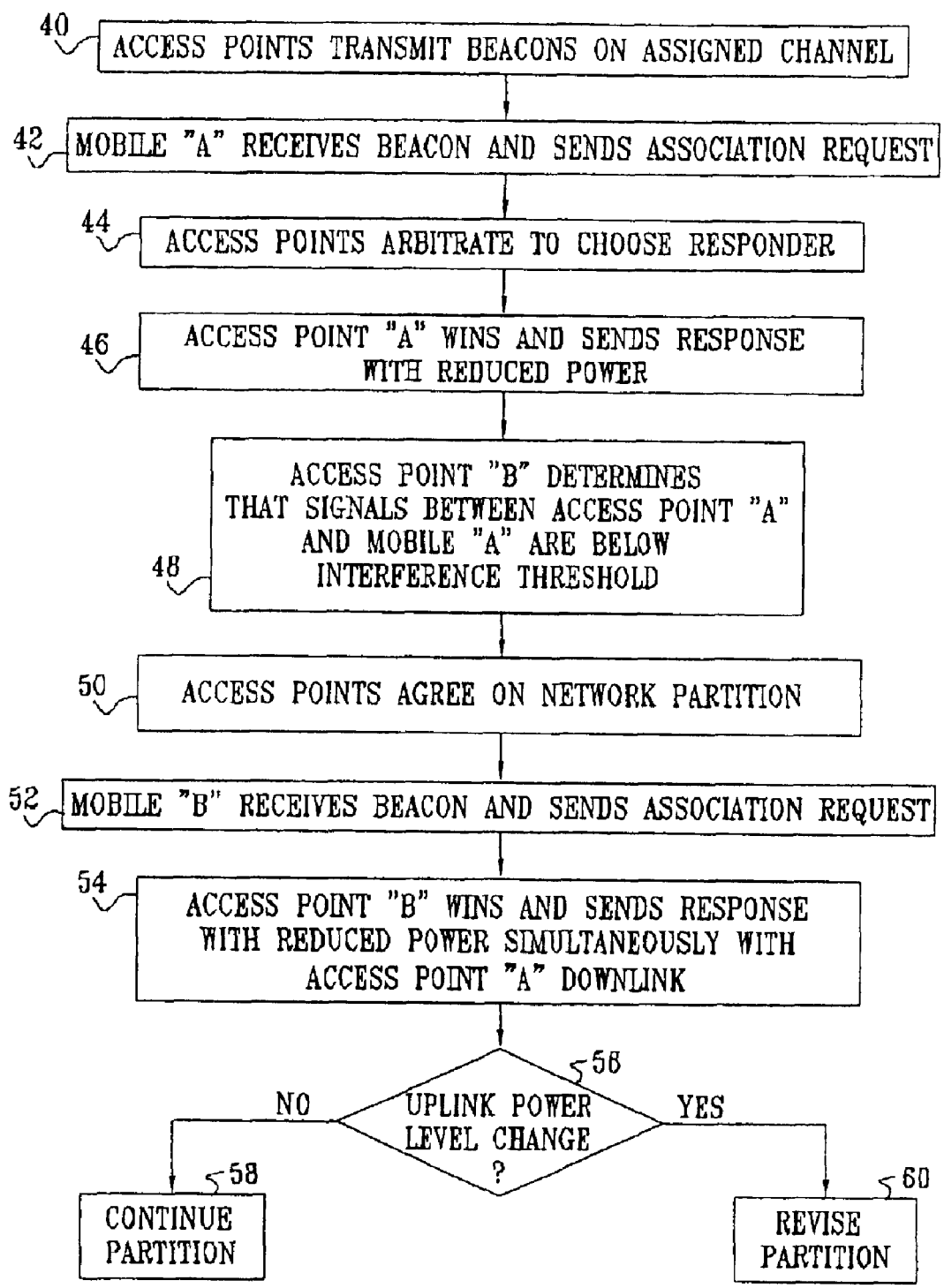
FIG. 2 is a flow chart that schematically illustrates a method for communication between multiple mobile stations and multiple wireless access points, in accordance with a preferred embodiment of the present invention.

FIG. 2 is a flow chart that schematically illustrates a method for collaboration between the access points in WLAN system 20, in accordance with a preferred embodiment of the present invention. Access points 22, 23, 25 and 27 transmit beacon signals on their common frequency channel, at a beacon transmission step 40. In accordance with the 802.11 standard, the beacon signals transmitted by any given access point provide the time base with which the mobile station should synchronize its communications and indicate the BSS identification (BSSID) of the access point. The BSSID can be regarded as the MAC address of the access point. In 802.11 WLAN systems known in the art, each access point has its own unique BSSID. In system 20, however, access points 22, 23, 25 and 27 share the same BSSID, so that they appear logically to the mobile stations to be a single, extended, distributed access point, which has multiple antennas at different locations. The time bases of the access points are mutually synchronized using medium 34 (or using low-latency messages on LAN 28), and the beacon signals transmitted by the access points are interlaced to avoid collision between them.

When mobile station 24, for example, receives a beacon signal of sufficient strength, it extracts the BSSID and time base from the signal, at a first beacon processing step 42. (Mobile station 24 is identified as "MOBILE A" in FIG. 2.) This step, as well as subsequent steps taken by the mobile stations in system 20, is completely in accordance with the 802.11 standard. In other words, the present invention can be implemented in a manner that is transparent to and requires no modification of legacy mobile stations. Using the time base and BSSID it has acquired, mobile station 24 sends an uplink signal, in the form of an association request message that is addressed to the BSSID and indicates the MAC address of the mobile station.

To determine which of the access points will respond to the association request message, the access points carry out an arbitration procedure using low-latency messaging over medium 34 or LAN 28, at an arbitration step 44. For this purpose, all access points that received the association request message from mobile station 24 broadcast messages, giving notice to the other access points that they have received an uplink message. The messaging and arbitration procedures are described in detail in the above-mentioned patent application entitled "Collaboration between Wireless LAN Access Points."

Each access point is able to determine whether it was first to send its message, or whether another access point preceded it, by comparing the time of receipt of these broadcast messages to the time at which the access point sent its own broadcast message. Typically, the access point that was able to be first in sending out its broadcast message in response to an uplink message from a given mobile station is in the best position to continue communications with the mobile station, since this access point is generally the closest one to the mobile station. Therefore, all the access points independently choose this first access point to respond to mobile station 24. Alternatively, other criteria, such as received signal power, may be applied in choosing the "winning" access point, as long as the criteria are applied uniformly by all the access points. Preferably, if a deadlock occurs (such as when two access points send their broadcast messages at the same instant), a predetermined formula is applied by all the access points to resolve the deadlock uniformly.

The winning access point sends an acknowledgment (ACK) message to mobile station 24, at a first response step 46, as required by the applicable WLAN standard. In the present example, we assume that access point 22 (identified as "ACCESS POINT A" in FIG. 2) is the winner. After sending the ACK, access point 22 typically sends an association response message to mobile station 24, and then continues its downlink transmission to the mobile station as appropriate. To determine the power level at which to send its downlink messages to mobile station 24, access point 22 measures the signal power of the uplink messages it has received from this mobile station. If the uplink signal power is significantly stronger than a predetermined minimum threshold, the access point applies a TPC procedure to determine the power level at which it should transmit downlink signals to this mobile station.

Any suitable TPC algorithm may be used for this purpose, including the TPC algorithm defined in the above-mentioned 802.11h Draft Standard. As a rule, the downlink power transmitted by the access point to a given mobile station is inversely proportional to the uplink power that it received from that mobile station. Thus, for example, access point 22 may transmit downlink signals to mobile station 29 with higher power (possibly even full power) than it transmits to mobile station 24. The optimal downlink power level in each case can be adjusted by trial-and-error transmission to each different mobile station. If there is no limitation on the downlink power imposed by any other access point, it is possible (for the sake of communication robustness) for access point 22 to continue transmitting at times at its maximum level. Otherwise, access point 22 preferably estimates the interference its transmissions will cause at other access points, and takes this interference into account in setting its own downlink transmission level.

While access point 22 transmits downlink signals to mobile station 24, other access points, such as access point 27 (identified in FIG. 2 as "ACCESS POINT B"), attempt to monitor the downlink signals, at an interference tracking step 48. Typically, the free-space interference range of a signal in a WLAN system is about five times its practical reception range, and in indoor environments the ratio of interference range to reception range may be even greater. Therefore, as long as an access point is transmitting at its full power level (as would be the case in a conventional WLAN), it is likely that the downlink signals from access point 22 will be received by access point 27 with a power level that is higher than the acceptable interference threshold.

When access point 22 uses TPC to reduce its downlink signal level, however, the signals received by access point 27 may very well fall below the interference threshold. Access point 27 may detect the weak signals, identify the signature of the transmitting access point (in accordance with the 802.11b standard, for example), and then analyze the signal levels to verify that a sufficient signal/interference margin exists for its own transmissions even in the presence of the weak signal. Even if access point 27 does not receive the downlink signals from access point 22, it can be aware that access point 22 is transmitting during certain intervals (referred to as "dwell periods"), because access point 22 preferably informs the other access points of its downlink transmissions by sending appropriate broadcast messages over medium 34 or LAN 28. Preferably (although not necessarily), access point 22 includes transmission power information in its broadcast messages, such as the nominal transmission level of its downlink signals. The other access points, such as access point 27, use this power information in determining whether they can transmit simultaneously with access point 22 and, if so, at what power level.

Thus, access point 27 may determine that the downlink signals sent by access point 22 to mobile station 24 are below the interference threshold. In such a case, access point 27 may initiate a partition of system 20 into sub-networks, at a partitioning step 50. The partition applies to the particular time intervals in which access point 22 transmits downlink signals to mobile station 24. It allows both access points 22 and 27 (and possibly other access points, as well) to transmit downlink signals simultaneously during these time intervals, as long as the signals are kept below an agreed threshold. Preferably, the threshold is chosen so as to maintain a reasonable margin between the estimated downlink signal strength received by mobile station 24 from access point 22 and the interference caused at mobile station 24 by downlink transmission from other access points to respective mobile stations. Optionally, to increase the likelihood that multiple access points will be able to transmit simultaneously, the threshold may be relaxed so that there is a high likelihood, but not certainty, that access points transmitting at a power level below the threshold will not mutually interfere. A mutual feedback mechanism may also be provided for trial-and-error adaptation of the transmitted downlink power, whereby access points transmitting during the same time intervals may notify one another of unsuccessful transmissions (due to excessive interference).

Subsequent to or simultaneously with step 50, another mobile station, say mobile station 31 (identified in FIG. 2 as "MOBILE B"), receives a beacon signal and sends an uplink association request, at a second beacon processing step 52. As at step 44, the access points receiving the association request arbitrate among themselves to determine which will respond. It is assumed that access point 27, which is nearest to mobile station 31, wins the arbitration, and thus sends a downlink ACK and association response to mobile station 31, at a second response step 54.

Before sending the response, access point 27 checks the power level of the uplink signal from mobile station 31, and uses the TPC algorithm to determines the appropriate downlink signal power it should use. If the required downlink power is less than the threshold agreed at step 50, access point 27 may transmit the downlink signals to mobile station 31 during the same time intervals in which access point 22 transmits to access point 24. In situations of the sort pictured in FIG. 1, in which relatively distant access points 22 and 27 communicate with respectively-nearby mobile stations 24 and 31, both access points will receive strong uplink signals from the respective access points, while receiving one another's downlink signals only weakly. Thus, the access points may transmit simultaneously at low transmission power, while maintaining good signal/interference margins.

Otherwise, if the signal from mobile station 31 is weaker, and access point 27 determines that the required downlink power is higher than the threshold, access point 27 waits to transmit until there is a time interval not used for downlink transmission by the other access points.

Each of access points 22 and 27 continues serving the respective mobile station, until the mobile station sends another uplink message, at a new uplink step 56. The arbitration protocol described above is then repeated, and a different access point may be chosen to serve the mobile station in the next round, particularly if the mobile station has moved in the interim. (Even if the mobile station has moved, there is no need to repeat the association protocol.) The winning access point checks the power level of the new uplink message. If the uplink power level is unchanged, then the access points can continue to maintain the same downlink power threshold and sub-network partition agreed on previously, at a continuation step 58.

On the other hand, if the uplink power has changed significantly, the access points may have to revise the partitioning scheme, at a revision step 60. In particular, if the uplink power from a given mobile station has significantly decreased, TPC will require the serving access point to increase the downlink power that it transmits to the mobile station. In this case, the access points may agree to alter the boundaries or power threshold of the partition originally determined at step 50, or they may abandon the partition completely.

As noted above, although preferred embodiments are described herein with reference to particular types of wireless and wired LANs and particular communication standards, the principles of the present invention are similarly applicable to other types of LANs and WLANs, which may operate in accordance with other standards. In addition, these principles may be applied in wireless personal area networks (PANs), as defined by IEEE Standard 802.15, including ultra-wide band (UWB) PANs. It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A method for mobile communication by access points in a wireless local area network (WLAN), wherein the access points include at least first and second access points and are configured to communicate on a common frequency channel with mobile stations, including at least first and second mobile stations, the method comprising:

receiving a first uplink signal from the first mobile station at the first access point with a first uplink power level;

transmitting a first downlink signal on the common frequency channel from the first access point to the first mobile station in response to the first uplink signal, at a first downlink power level, which is adjusted responsively to the first uplink power level to be less than a maximum downlink power level;

making a determination that while the first access point is transmitting the first downlink signal at the first downlink power level, the first downlink signal received at the second access point is below a predetermined interference threshold;

receiving a second uplink signal from the second mobile station at the second access point; and responsive to the determination, transmitting a second downlink signal on the common frequency channel from the second access point to the second mobile station in response to the second uplink signal, simultaneously with transmission of the first downlink signal from the first access point to the first mobile station.

2. A method according to claim 1, wherein the access points have respective service areas within a region served by the WLAN, and wherein the access points are arranged so that at least some of the service areas substantially overlap.

3. A method according to claim 2, wherein transmitting the second downlink signal comprises partitioning the region served by the WLAN so as to define non-overlapping first and second sub-regions served respectively by the first and second access points.

4. A method according to claim 1, wherein the access points are arranged so that when the first access point transmits the first downlink signal at the maximum power level, the first downlink signal received at the second access point is above the predetermined interference threshold.

5. A method according to claim 1, wherein the first and second downlink signals are transmitted substantially in accordance with IEEE Standard 802.11.

6. A method according to claim 1, wherein transmitting the first downlink signal comprises arbitrating among the access points so as to select the first access point to transmit the first downlink signal.

7. A method according to claim 6, wherein arbitrating among the access points comprises sending broadcast messages from the access points receiving the first uplink signal, and selecting the first access point responsive to the broadcast messages.

8. A method according to claim 1, wherein transmitting the first downlink signal comprises making a first association between the first access point and the first mobile station, and informing the second access point of the first association, and wherein making the determination comprises measuring the first downlink signal received at the second access point responsively to the first association.

9. A method according to claim 8, wherein informing the second access point of the first association comprises notifying the second access point of one or more time intervals during which the first access point is to transmit the first downlink signal, and wherein measuring the first downlink signal comprises monitoring signals received by the second access point during at least one of the time intervals.

10. A method according to claim 9, wherein transmitting the second downlink signal comprises transmitting the second downlink signal during the one or more time intervals after determining that the first downlink signal received at the second access point is below the predetermined interference threshold.

11. A method according to claim 1, wherein making the determination comprises receiving the first downlink signal at the second access point, and identifying a signature of the first access point in the received first downlink signal.

12. A method according to claim 1, wherein transmitting the second downlink signal comprises sending a message from the second access point to the first access point so as to inform the first access point that the second access point is transmitting simultaneously with the first access point.

13. A method according to claim 1, wherein receiving the second uplink signal comprises receiving the second uplink signal at the second access point with a second uplink power level, and wherein transmitting the second downlink signal comprises adjusting a second downlink power level of the second downlink signal in response to the second uplink power level, so that the second downlink signal received at the first access point is below the predetermined interference threshold.

14. A method according to claim 13, wherein receiving the second uplink signal comprises sensing a change in the second uplink power level, and wherein transmitting the second downlink signal comprises, responsive to the change, ceasing to transmit the second downlink signal simultaneously with the transmission of the first downlink signal.

15. Apparatus for mobile communication, comprising a plurality of access points arranged in a wireless local area network (WLAN) and configured to communicate on a common frequency channel with mobile stations, including at least first and second mobile stations, the access points comprising at least first and second access points, wherein in response to receiving a first uplink signal from the first mobile station at the first access point with a first uplink power level, the first access point transmits a first downlink signal on the common frequency channel to the first mobile station at a first downlink power level, which is adjusted responsively to the first uplink power level to be less than a maximum downlink power level, and wherein the second access point is adapted to make a determination that while the first access point is transmitting the first downlink signal at the first downlink power level, the first downlink signal received at the second access point is below a predetermined interference threshold, and wherein in response to receiving a second uplink signal from the second mobile station at the second access point, and responsive to the determination, the second access point transmits a second downlink signal on the common frequency channel to the second mobile station simultaneously with transmission of the first downlink signal from the first access point to the first mobile station.

16. Apparatus according to claim 15, wherein the access points have respective service areas within a region served by the WLAN, and wherein the access points are arranged so that at least some of the service areas substantially overlap.

17. Apparatus according to claim 16, wherein the access points are adapted to communicate with one another in order to partition the region served by the WLAN so as to define non-overlapping first and second sub-regions served respectively by the first and second access points.

18. Apparatus according to claim 15, wherein the access points are arranged so that when the first access point transmits the first downlink signal at the maximum power level, the first downlink signal received at the second access point is above the predetermined interference threshold.

19. Apparatus according to claim 15, wherein the first and second downlink signals are transmitted substantially in accordance with IEEE Standard 802.11.

20. Apparatus according to claim 15, wherein the access points are adapted to communicate with one another so as to carry out an arbitration procedure in order to select the first access point to transmit the first downlink signal.

21. Apparatus according to claim 20, and comprising a communication medium interconnecting the access points, wherein the access points receiving the first uplink signal are adapted to send broadcast messages over the communication medium, and to select the first access point responsive to the broadcast messages.

22. Apparatus according to claim 15, wherein the first access point is adapted to make a first association between the first access point and the first mobile station, and to inform the second access point of the first association, and wherein the second access point is adapted to make the determination that the first downlink signal is below the predetermined interference threshold by measuring the first downlink signal received at the second access point responsively to the first association.

23. Apparatus according to claim 22, wherein the first access point is adapted to notify the second access point of one or more time intervals during which the first access point is to transmit the first downlink signal, and wherein the second access point is adapted to measure the signals received by the second access point during at least one of the time intervals.

24. Apparatus according to claim 23, wherein the second access point is adapted to transmit the second downlink signal during the one or more time intervals after determining that the first downlink signal received at the second access point is below the predetermined interference threshold.

25. Apparatus according to claim 15, wherein the second access point is adapted to make the determination by receiving the first downlink signal, and identifying a signature of the first access point in the received first downlink signal.

26. Apparatus according to claim 15, wherein the second access point is adapted to send a message to the first access point so as to inform the first access point that the second access point is transmitting simultaneously with the first access point.

27. Apparatus according to claim 15, wherein upon receiving the second uplink signal at a second uplink power level, the second access point is adapted to adjust a second downlink power level of the second downlink signal in response to the second uplink power level, so that the second downlink signal received at the first access point is below the predetermined interference threshold.

28. Apparatus according to claim 27, wherein the second access point is adapted to detect a change in the second uplink power level, and responsive to the change, to cease to transmit the second downlink signal simultaneously with the transmission of the first downlink signal.

* * * * *